(12) United States Patent
Wang et al.

(10) Patent No.: US 11,468,543 B1
(45) Date of Patent: Oct. 11, 2022

(54) NEURAL-NETWORK FOR RAW LOW-LIGHT IMAGE ENHANCEMENT

(71) Applicant: Hong Kong Applied Science and Technology Research Institute Company, Limited, Hong Kong (HK)

(72) Inventors: Li-Wen Wang, Hong Kong (HK); Wan-Chi Siu, Hong Kong (HK); Zhi-Song Liu, Hong Kong (HK); Yan Huo, Hong Kong (HK); Xingbo Guan, Hong Kong (HK); Miaohui Hao, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 17/458,802

(22) Filed: Aug. 27, 2021

(51) Int. Cl.
*G06T 5/00* (2006.01)

(52) U.S. Cl.
CPC ...... *G06T 5/00* (2013.01); *G06T 2207/20081* (2013.01)

(58) Field of Classification Search
None
See application file for complete search history.

(56) References Cited

U.S. PATENT DOCUMENTS

2018/0276455 A1* 9/2018 An .................. G06V 40/172
2018/0300855 A1 10/2018 Tang et al.
2020/0234414 A1* 7/2020 Zamir .................. G06T 5/001
2021/0183030 A1* 6/2021 Meng .................. G06T 5/002
2022/0148157 A1* 5/2022 Prasad ................ G06T 7/0012

FOREIGN PATENT DOCUMENTS

| CN | 110378845 A | 10/2019 |
|---|---|---|
| CN | 111080515 A | 4/2020 |
| CN | 111612722 A | 9/2020 |
| CN | 110210608 A | 3/2021 |

(Continued)

OTHER PUBLICATIONS

ISR and Written Opinion, PCT/CN2021/116112, dated May 26, 2022.

(Continued)

*Primary Examiner* — Soo Shin
(74) *Attorney, Agent, or Firm* — Stuart T. Auvinen; aPatent LLC

(57) ABSTRACT

A neural network receives mono-color pixels in a Bayer pattern from an image sensor and interpolates pixels to generate full-color RGB pixels while also enlightening the image for better detail. A Back-Projection (BP) layer is added to each contracting layer in a U-net convolution neural network where feature depth is increased as pixels are downsampled, while a BP channel shrink layer is added to each expansion layer where feature depth is reduced to upsample and increase pixel resolution. Convolution layers in the BP layer lighten and darken images to generate an error that is then lightened and added to a weighted lightened input. The neural network learns the best weightings to correct for noise and error in the lightening process in these BP layers. Noise is reduced further by repeating a convolution and leaky Rectified Linear Unit (lrelu) in series for the first convolution in the BP layer that performs lightening.

20 Claims, 13 Drawing Sheets

(56) References Cited

FOREIGN PATENT DOCUMENTS

CN 113012074 A 6/2021
WO WO2021063341 A1 4/2021

OTHER PUBLICATIONS

Wang Li-Wen, et al., "Lightening Network for Low-light Image Enhancement", IEEE trans Image Proc 31, Dec. 2020, pp. 1-12.
Li-Wen Wang et al.,"Lightening Network for Low-light Image Enhancement", IEEE Transactions on Image Processing, DOI 10.1109/TIP.2020.3008396, Jul. 15, 2020, pp. 1-12.
Chen Chen, Qifeng Chen, Jia Xu and Vladlen Koltun, "Learning to see in the dark," Proc IEEE Conf on Computer Vision and Pattern Recognition, pp. 3291-3300, 2018.
Cheng Zhang, Qingsen Yan, Yu Zhu, Xianjun Li, Jinqiu Sun and Yanning Zhang, "Attention-based network for low-light image enhancement," Proceedings, 2020 IEEE Int'l Conf on Multimedia and Expo (ICME), pp. 1-6, 2020.

* cited by examiner

FIG. 3

PRIOR ART

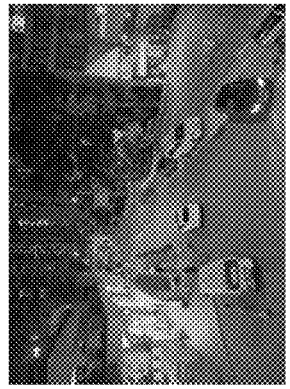
FIG. 4A  ENLIGHTEN →  FIG. 4B
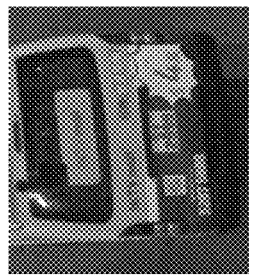
FIG. 4C  ENLIGHTEN →  FIG. 4D
PRIOR ART

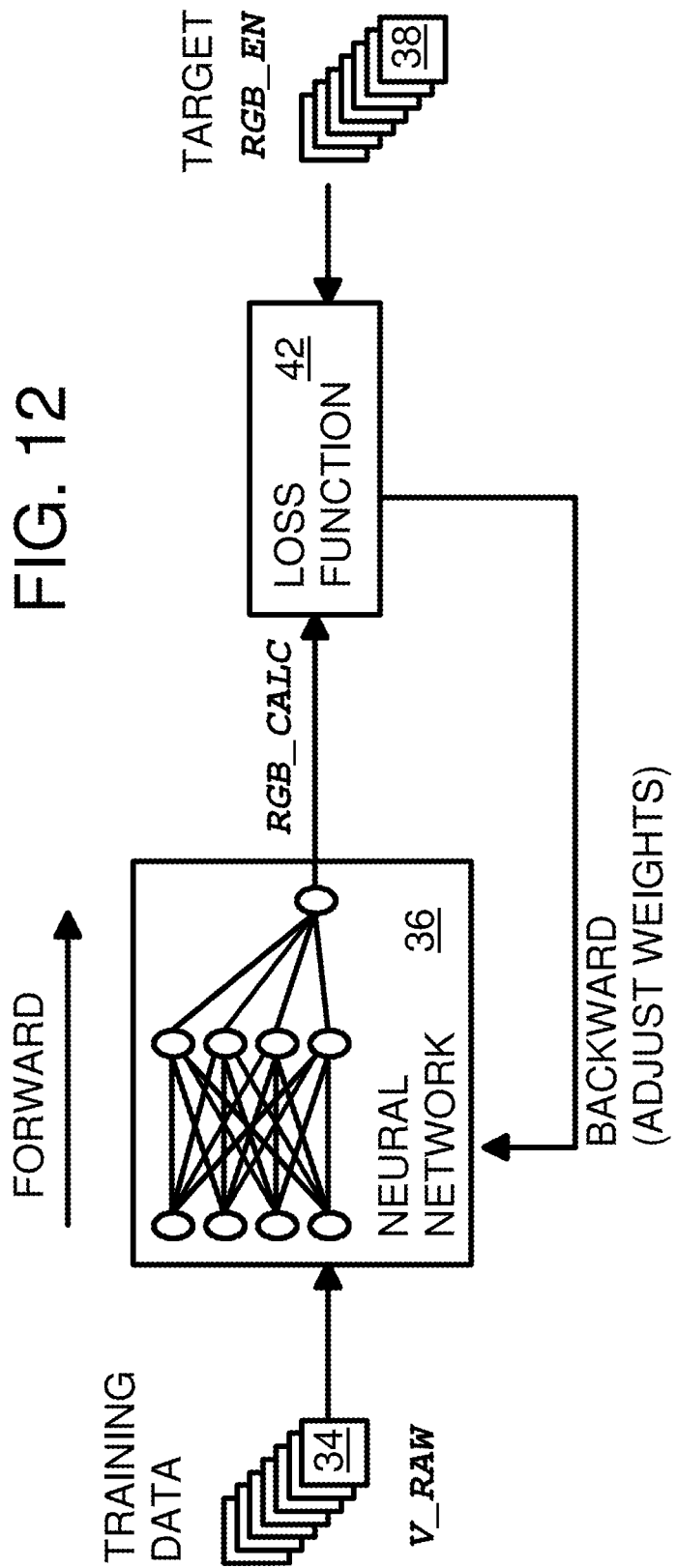

NEURAL-NETWORK FOR RAW LOW-LIGHT IMAGE ENHANCEMENT

FIELD OF THE INVENTION

This invention relates to Neural Networks, and more particularly for image-enhancement using Neural Networks.

BACKGROUND OF THE INVENTION

Image processing is widely used for tasks such as facial recognition, Optical Character Recognition (OCR) such as to read license plates on moving cars, and object tracking for autonomous vehicle collision avoidance. Image data is often processed using Neural Networks.

Artificial Neural Networks are especially useful for processing large amounts of data in complex ways that are hard to define using traditional computer programs. Instead of being programmed with instructions, training data is input to a neural network and compared to the expected output, then adjustments are made within the neural network and the training data is again processed and outputs compared to generate further adjustments to the neural network. After many such training cycles, the neural network is altered to efficiently process data similar to the training data and expected outputs. Neural networks are an example of machine learning, since the neural network learns how to generate the expected outputs for the training data. Real data similar to the training data can then be input to the neural network to process live data.

FIG. 1 illustrates a prior art neural network. Input nodes 102, 104, 106, 108 receive input data $I_1, I_2, I_3, \ldots I_4$, while output nodes 103, 105, 107, 109 output the result of the neural network's operations, output data $O_1, O_2, O_3, \ldots O_4$. Three layers of operations are performed within this neural network. Nodes 110, 112, 114, 116, 118, each take inputs from one or more of input nodes 102, 104, 106, 108, perform some operation, such as addition, subtraction, multiplication, or more complex operations, and send and output to nodes in the second layer. Second-layer nodes 120, 122, 124, 126, 128, 129 also receive multiple inputs, combines these inputs to generate an output, and sends the outputs on to third-level nodes 132, 134, 136, 138, 139, which similarly combine inputs and generate outputs.

The inputs at each level are typically weighted, so weighted sums (or other weighted operation results) are generated at each node. These weights can be designated $W_{31}, W_{32}, W_{32}, W_{33}, \ldots W_{41}$, etc., and have their values adjusted during training. Through trial and error or other training routines, eventually higher weights can be given for paths that generate the expected outputs, while smaller weights assigned to paths that do not generate the expected outputs. The machine learns which paths generate the expected outputs and assigns high weights to inputs along these paths.

These weights can be stored in weights memory 100. Since many neural networks have many nodes, there may be many weights to store in weights memory 100. Each weight may require multiple binary bits to represent a range of possible values for that weight.

Deep neural networks have many layers of nodes and are often used for applications such as object classification, speech recognition, sentiment analysis, image recognition, facial detection, and other graphics processing. Images in a video sequence can be captured and processed by a smart digital camera system.

FIG. 2 is a block diagram for a smart digital camera system. Light focused through a lens is directed toward sensor 512, which can be a charge-coupled device (CCD) array or a complementary metal-oxide-semiconductor (CMOS) sensor array. The light falling on the array generates electrical currents, which are amplified by an analog amp before being converted from analog to digital values by an A/D converter. An 8, 9, or 10-bit mono-color pixel is output to Image Signal Processor (ISP) 502. These mono-color pixels are in a Bayer-pattern as shown in FIG. 3. Each pixel is either a red, a blue, or a green intensity. Each pixel has only one of the 3 color components rather than all 3 components per pixel.

The R, G, or B digital values in the Bayer (or Beyer) pattern are processed by an interpolator such as a color-space converter in ISP 502 to interpolate missing pixels in the Bayer pattern. The filled-in pixels each have all 3 color components—R, G, and B. The filled-in RGB pixels in the full RGB pattern are output for further processing by System-on-a-Chip (SoC) 504 or for display on a display device such as a Liquid-Crystal Display (LCD) flat screen (not shown).

Sensor 512 detects red, blue and green colors. However, each array point in sensor 512 can detect only one of the three primary colors. Rather than outputting an RGB pixel, sensor 512 can output only a single-color pixel at any given time. For example, a line of pixels output by sensor 512 might have a red pixel followed by a green pixel. Another line might have alternating green and blue pixels.

Each pixel represents the intensity of one of the primary colors at a point in the sensor array. Thus a red pixel indicates the intensity of red light at a point, while a neighboring green pixel indicates the intensity of green light at the next point in the sensor array. Each pixel thus contains only one-third of the total color information.

The remaining color information is obtained by interpolation. The green intensity of a red pixel is calculated by averaging the green intensities of neighboring green pixels. The blue intensity for that red pixel is calculated by averaging or interpolating the nearest blue pixels. ISP 502 10 performs this color interpolation, calculating the missing primary-color intensities for each pixel location.

The electrical currents produced by the different primary colors can vary, depending on the sensor used and the wavelength and energy of the light photons. An adjustment known as a white-balance is often performed before the interpolator. Each primary color can be multiplied by a different gain to better balance the colors. Compensation can also be made for different lighting conditions, increasing all primary colors for dark pictures or decreasing all colors for bright pictures (overexposure).

ISP 502 can perform a variety of functions on the Bayer pattern image either before or after interpolation into the RGB pattern, such as edge sharpening, gamma correction, removing distortions, de-mosaicing, Automatic White Balance (AWB), Automatic Gain Control (AGC), and Automatic Exposure Control (AEC).

The full RGB pattern that has all three colors for each pixel location is sent from ISP 502 to SoC 504. SoC 504 performs more complex image processing, such as facial recognition, text extraction, etc. SoC 504 can have an I/O interface, a Central Processing Unit (CPU), a video codec, and specialized processors such as a Numeric Processing Unit (NPU), a Digital Signal Processor (DSP), or a Graphics Processing Unit (GPU).

Bayer Pattern—FIG. 3

Figure 3:
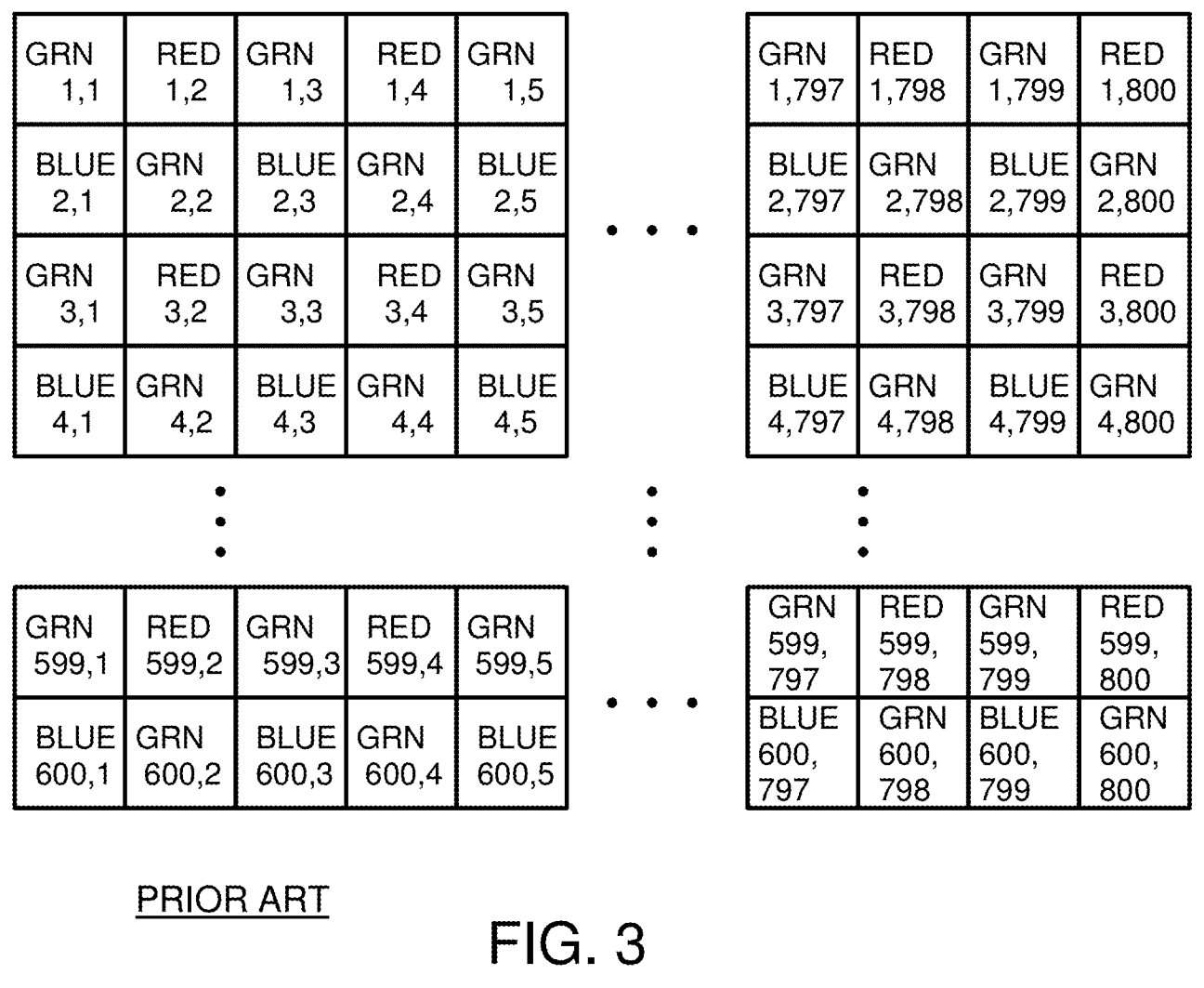

FIG. 3 shows an image captured by a sensor that generates single-color pixels in a Bayer pattern. The example shows an 800×600 frame or image for display in the common super-VGA resolution. A total of 600 lines are captured by the sensor, with 800 pixels per line.

Personal computers and many other devices display full-color pixels that have all three primary-color intensities (RGB). In contrast, the sensor in a digital camera such as sensor 512 in FIG. 2 can detect only one of the three primary colors for each point in the 800×600 sensor array. Detectors for green are alternated with red detectors in the first line, while green detectors are alternated with blue detectors in the second line.

The first horizontal line and each odd line have alternating red and green detectors, so pixels output from these odd lines are in a G-R-G-R-G-R-G sequence. The second horizontal line and each even line have alternating green and blue detectors, so pixels output from these even lines are in a B-GB-GB-GB sequence.

Half of the pixels are green pixels, while one-quarter of the pixels are red and the last quarter are blue. The green pixels form a checkerboard pattern, with blue and red pixels surrounded by green pixels. Since the human eye is more sensitive to green, the Bayer pattern has more green pixels than red or blue.

The green intensity for a red pixel location can be interpolated by averaging the four green pixels that surround the red pixel. For example, the green intensity for red pixel at location (3,2) is the sum of green pixels (3,1), (3,3), (2,2), and (4,2), divided by four. Likewise, the green intensity for a blue pixel location can be interpolated by averaging the four surrounding green pixels. For blue pixel (2,3), the interpolated green intensity is the sum of green pixels (2,2), (2,4), (1,3), and (3,3), divided by four.

The red and blue values for a green pixel location can also be calculated from the 2 red and 2 blue pixels that surround each green pixel. For green pixel (2,2), the interpolated red value is the average of red pixels (1,2) and (3,2) above and below the green pixel, while the interpolated blue value is the average of blue pixels (2,1) and (2,3) to the right and left of the green pixel.

FIGS. 4A and 4C are dark images that are enlightened to generate FIGS. 4B and 4D for further image processing. Complex image processing such as performed by SoC 504 (FIG. 2) can have poor performance for low-light images, such as images from night surveillance systems.

In FIG. 4A, the raw Bayer pattern image from sensor 512 (FIG. 2) is very dark and it is difficult for either humans or image processors to detect key feature details in the image, such as faces or license plates. An enlightening operation on FIG. 4A results in the enlightened image of FIG. 4B, where cars are recognizable.

FIG. 4C is an enlargement of a portion of the image of FIG. 4A. The raw image is so dark that image processing has difficulty extracting details. However, when the enlargement dark raw image of FIG. 4C is enlightened, the resulting image in FIG. 4D can be used by image processing in SoC 504 to extract the license plate number on the vehicle.

A typical ISP 502 generates RGB images that are sometimes too dark, such as shown in FIGS. 4A, 4C. These full RGB images are too dark for SoC 504 to accurately extract feature details. Although the RGB image from ISP 502 is generic so that SoC 504 can process images from many different camera sources, much of the low-light information that was available in the raw Bayer-pattern image from sensor 512 has been lost by processing in ISP 502 and is no longer present in the RGB pattern sent from ISP 502 to SoC 504.

Pixel interpolation by ISP 502 typically results in a loss of low-light information in the RGB image output to SoC 504. Especially for extremely low-light images, enlightening of the RGB image by SoC 504 produces a processed image that cannot recover the low-light details that are lost by ISP 502 performing color-space conversion from Bayer to RGB.

What is desired is a low-light image enhancer that enlightens Bayer-pattern images to produce full RGB images. It is desired to combine pixel interpolation with low-light image enlightening so that both interpolation and enlightening are performed on the same low-light Bayer-pattern image. It is desired to train a Neural Network to enlighten images while performing color-space conversion from Bayer patterns to RGB patterns. It is desired to train a deep neural network to transform raw Bayer-pattern images into enlightened RGB images. A neural network with a Back-Projection layer is desired to better train the neural network for low-light image enlightening when converting from Bayer-pattern to RGB images.

BRIEF DESCRIPTION OF THE DRAWINGS

FIG. 3 shows an image captured by a sensor that generates single-color pixels in a Bayer pattern.

FIGS. 4A and 4C are dark images that are enlightened to generate FIGS. 4B and 4D for further image processing.

FIG. 12 shows training a neural network such as the neural network of FIG. 1 or 5-12.

DETAILED DESCRIPTION

The present invention relates to an improvement in image processing neural networks. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
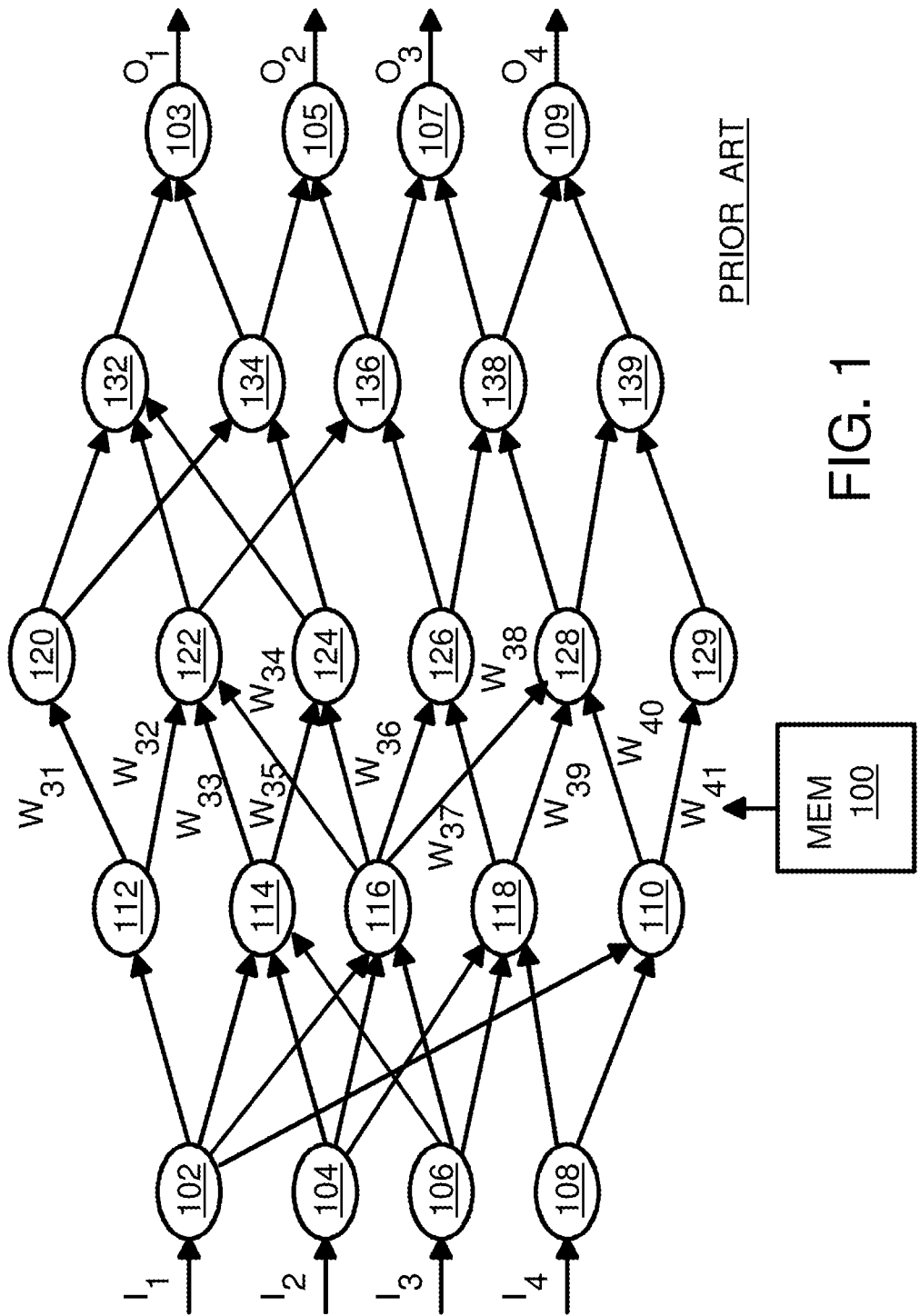
FIG. 1 illustrates a prior art neural network.
Figure 2:
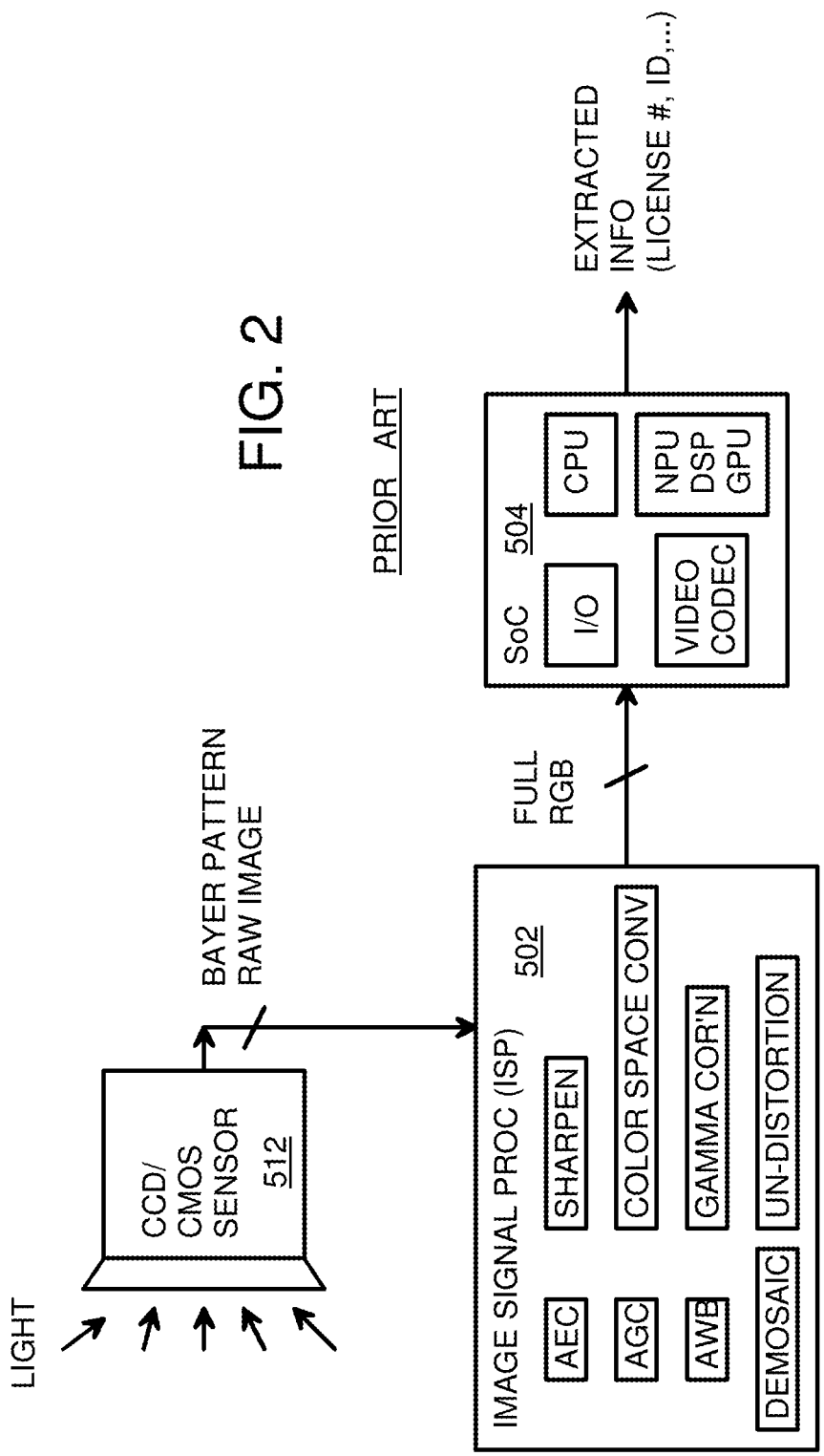
FIG. 2 is a block diagram for a smart digital camera system.
Figure 5:
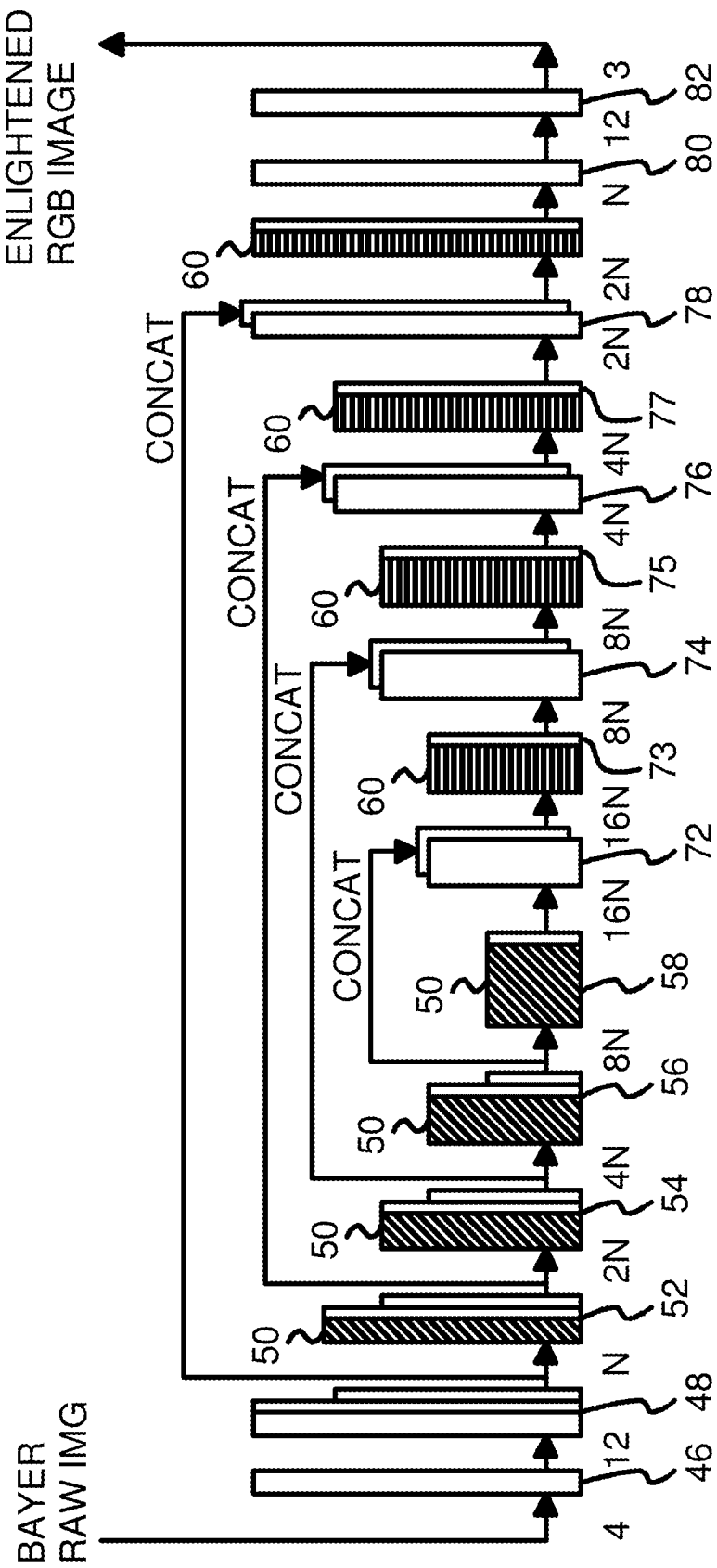
FIG. 5 is a block diagram of a convolution neural network with Back-Projection layers for enlightening single-pixel images to produce enlightened full-color pixel images.

FIG. 5 is a block diagram of a convolution neural network with Back-Projection layers for enlightening single-pixel images to produce enlightened full-color pixel images. The neural network of FIG. 5 is a Convolutional Neural Network (CNN) with a U-Net architecture. A U-shape network is formed by a contracting path of contracting layers 52, 54, 56, 58 that successively reduce spatial information and increase feature (depth) information, and an expanding path of expansion layers 72, 74, 76, 78 that increase spatial information while decreasing feature depth.

The spatial information can be based on a frame of pixels of height H and width W, such as 480×480 pixels. The frame size is reduced by successive contracting layers 52, 54, 56, 58 while the feature depth is expanded by features extracted by each layer until the bottom of the U shape is reached at contracting layer 58. Then the frame size is increased, and the depth is reduced as feature information in the depth is converted to spatial pixel data by (expansion layers 72, 74, 76, 78.

For example, an H×W frame of pixels with a feature depth of n [n, H, W] input to layer 52 could be reduced to a frame of H/2, W/2 pixels input to layer 54 while the depth doubles to 2n, or [2n, H/2, W/2]. Then spatial contraction and depth increase continue for contracting layers 56, 58 with input datasets of [4n, H/4, W/4] and [8n, H/8, W/8], respectively. Finally, contracting layer 58 outputs a dataset of [16n, H/16, W/16]. At this point, each spatial point corresponds to one 16×16 macroblock in the original image frame. However, 16 times more depth features are stored for this one spatial point.

Then expansion layers 72, 74, 76, 78 expand the spatial data using feature data while reducing feature-map depths. The depth decreases and the frame sizes increase, from [16n, H/16, W/16] input to expansion layer 72, to [8n, H/8, W/8] input to expansion layer 74, [4n, H/4, W/4] input to expansion layer 76, [2n, H/2, W/2] input to expansion layer 78, and [n, H, W] output by expansion layer 78. The feature depth parameter n can be set to 32, 24, 16, or some other value, depending on the computational complexity.

Each of contracting layers 52, 54, 56, 58 has a Back-Projection (BP) layer 50 that is specially modified to perform enlightening operations. BP layer 50 is shown in more detail in FIGS. 6-7. The output of BP layer 50 in each of contracting layers 52, 54, 56, 58 is followed by a channel-attention layer and a max pooling layer. The channel attention layer could be the combination shown later in FIG. 9. The max pooling layer can perform the operation:

Max pooling layer: nn.MaxPool2d(kernel_size=2), where H and W of the output is half of the input. Kernal size is the size of the convolution kernel, 2d or 2D means two dimensions. There are several blocks in each BP layer. Each block is a combination of 2D convolutions and activation functions. In cony block 1, there are two "2D convolution+activation functions" in sequence; the kernel size of the first 2D convolution is 3, stride=1, input channel/depth number=ch, output channel/depth number=2*ch. The first activation function is lrelu, the kernel size of the second 2D convolution is 3, stride=1, input channel/depth number=2*ch, output channel/depth number=2*ch, and the second activation function is also lrelu. In Conv block 2, there is only one "2D convolution+activation function" in sequence; the kernel size of the 2D convolution is 3, stride=1, input channel/depth number=2*ch, output channel/depth number=2*ch, and the activation function is lrelu. In Cony block3, there is only one "2D convolution+activation function" in sequence; the kernel size of the 2D convolution is 1, stride=2, input channel/depth number=ch, output channel/depth number=2*ch, and the activation function is lrelu. In Cony block4, there is only one "2D convolution+activation function" in sequence; the kernel size of the 2D convolution is 1, stride=1, input channel/depth number=2*ch, output channel/depth number=2*ch, and the activation function is lrelu. In Cony block5, there is only one "2D convolution+activation function" in sequence; the kernel size of the 2D convolution is 3, stride=1, input channel/depth number=2*ch, output channel/depth number=2*ch.

Each of expansion layers 72, 74, 76, 78 has a transpose layer and a concatenation layer. Each of these transpose layers performs the operation:

Transpose layer: nn.ConvTranspose2d(channel_num, channel_num/2, kernel_size=2, stride=2), with the input dimension at [channel_num, H, W], the output dimension at [channel_num/2, 2H, 2 W], where channel_num is the layer depth, and stride is the spatial scale to enlarge the feature map; in this embodiment, the input feature's spatial dimension is (H,W), when the stride=2, the output feature's spatial dimension will be (2H,2 W).

The concatenation in expansion layers 72, 74, 76, 78 is with a corresponding output of contracting layers 52, 54, 56, 58. Expansion layer 72 concatenates with the output of the 2D transpose output from layer 58, and output from contracting layer 56. Expansion layer 74 concatenates with the output of 2D transpose 73 of previous BP channel shrink layer 60 with contracting layer 54. Expansion layer 76 concatenates with the output of 2D transpose 75 of previous BP channel shrink layer 60 and contracting layer 52. Expansion layer 78 concatenates with the output of 2D transpose 77 of previous BP channel shrink layer 60, and first layer 48.

Each of expansion layers 72, 74, 76, 78 is followed by an instance of BP channel shrink layer 60. The outputs of concatenation from each of expansion layers 72, 74, 76, 78 are input to BP channel shrink layer 60. BP channel shrink layer 60 is shown in more detail in FIG. 8. BP channel shrink layer 60 performs convolutions to the concatenation layers from expansion layers 72, 74, 76, 78. This combines the lightening results from different scales of feature maps. More detailed information is kept in a large resolution feature map, and more global information is kept in a smaller resolution feature map. With these concatenated features from different spatial scales as inputs to BP channel shrink layer 60, BP channel shrink layer 60 can select what kind of information or what kind of combination will be more useful to restore the image. Thus BP channel shrink layer 60 can further enlighten the image.

Each BP channel shrink layer 60 is followed by a channel attention layer such as the combination shown later in FIG. 9. Each BP channel shrink layer 60 reduces the feature depth or shrinks the feature depth by half. For example, the first BP channel shrink layer 60 between expansion layers 72, 74 shrinks the feature depth from 16n to 8n, while the last BP channel shrink layer 60 after expansion layer 78 reduces the feature depth from 2n to n.

The initial Bayer pattern image is pre-processed by initial concatenate layer 46 and first layer 48. Initial concatenate layer 46 outputs the concatenation of three raw images with different scale factors or that were shot at different time slots. The output of initial concatenate layer 46 has the dimension at [12, H, W]. The depth of the initial Bayer raw image is 4 since the Bayer pattern is a repeating pattern R, G1, B, G2 of single-color Bayer pixels for Red (R), Green (G1), Blue (B), and Green (G2).

First layer 48 performs the operation:

First layer: sequential(nn.Conv2d(12, n, kernel_size=3, stride=1, padding=1), lrelu), and has an output dimension of [n, H, W] after the leaky ReLU (lrelu) operation. Sequential means two operations follow one by one; here the first operation is 2D convolution and the second operation is leaky ReLU. The padding parameter is an operation when processing the pixel at the boarder of the image; padding=1 means adding one zero value pixel at the boarder of the image. Also, nn.Conv2d means a 2D convolution.

Thus first layer 48 uses a 2D convolution to convert the depth from 12 to n.

Post-processing is performed by last layer 80 and depth-to-space layer 82. Last layer 80 converts the n-deep output from the last of BP channel shrink layer 60 to a 12-bit depth using the operation:

Last layer: sequential(nn.Conv2d(n, 12, kernel_size=1, stride=1, padding=1), lrelu), with the output dimension at [12, H, W] after the leaky ReLU operation.

Depth-to-space layer 82 converts input dimensions [12, H, W] to output dimensions [3, 2H, 2 W]. The number of pixels per frame is doubled in the output RGB compared with the input Bayer pattern. The resolution of the 4 channel Bayer pattern image is (H,W), while the resolution of the original Bayer pattern image is (2H, 2 W). After the image enhancement, the resolution of the output RGB image will be (2H, 2 W), and the output resolution will be exactly the same as the original Bayer pattern image. The output RGB has full-color pixels while the input Bayer pattern has single-color pixels.

Figure 6:
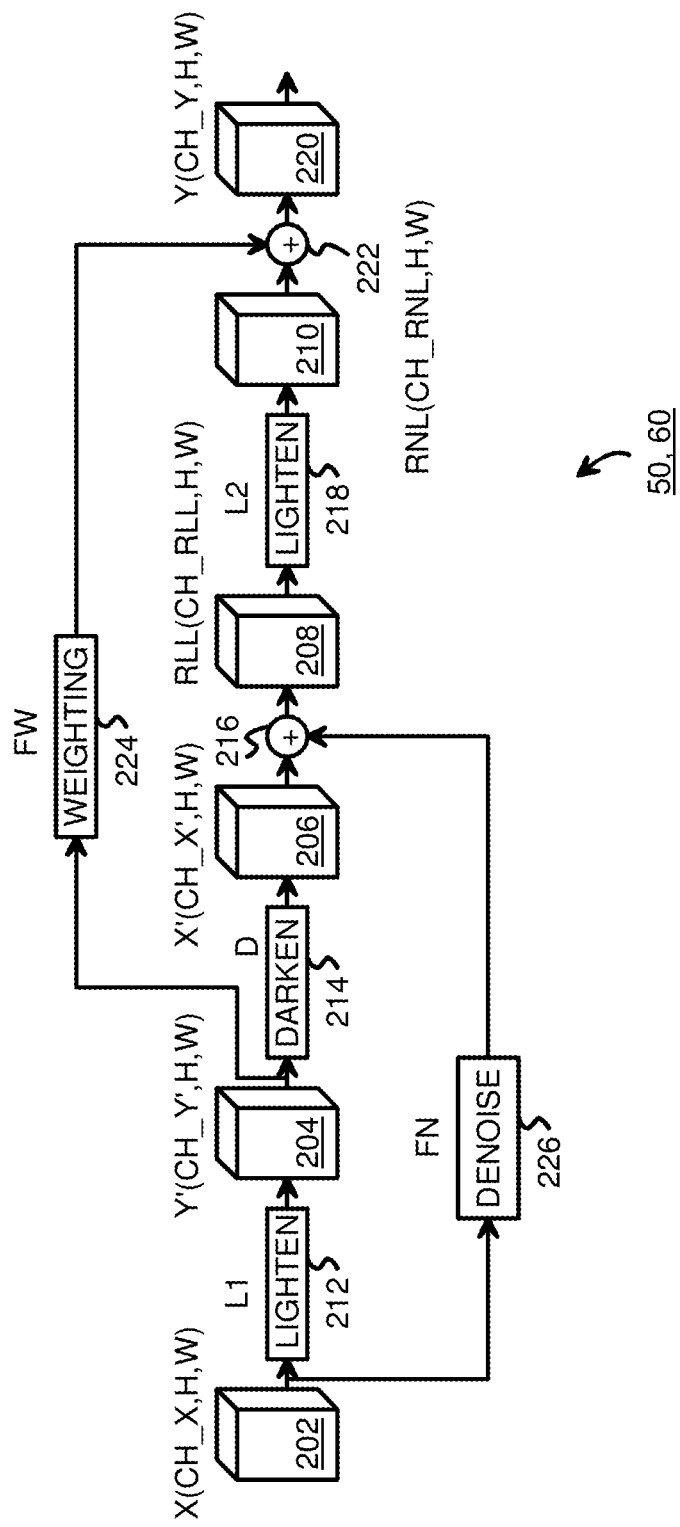
FIG. 6 highlights the basic operation of the BP layer.

FIG. 6 highlights the basic operation of the BP layer. The inventors propose a Low-Light (LL) domain that corresponds to images before enlightening, and a Normal Light (NL) domain that corresponds to images atter enlightening. Dark images may be transformed from the LL domain to the NL domain by L1 lightening operator 212 or by L2 lightening operator 218. Lightened images may be transformed from the NL domain back to the LL domain by D darkening operator 214.

Raw images 202 from the LL domain X(CH,H,W) are enlightened by L1 lightening operator 212 to generate predicted enlightened image 204, Y'(CH_Y',H,W), in the NL domain. This predicted enlightened image 204 is then darkened by D darkening operator 214 to generate back-projected LL domain image 206, X'(CH_X',H,W).

Back-projected LL domain image 206, X'(CH_X',H,W), is then compared to raw image 202 by adder 216, which subtracts 202 raw image after de-noising by FN de-noise operator 226 that filters out noise. The difference result from adder 216 is BP error 208 caused by L1 lightening operator 212. This BP error 208, RLL(CH_RLL,H,W), is in the LL domain.

The calculated back-projection error 208, RLL(CH_RLL, H,W), is then converted from the LL domain to the NL domain by L2 lightening operator 218, producing NL-domain BP error 210, RNL(CH_RNL,H,W).

Predicted enlightened image 204, Y'(CH_Y',H,W), in the NL domain, is weighted by FW weighting operator 224 and then added to NL-domain BP error 210, RNL(CH_RNL,H, W) by adder 222 to generate enhanced output 220, (Y_CH H,W), which is the enlightened image in the NL domain.

L1 lightening operator 212, D darkening operator 214, L2 lightening operator 218, FW weighting operator 224, and FN de-noise operator 226 can be implemented as convolution blocks with the parameters of these convolution blocks obtained through deep learning of the neural network. Optimal values can be obtained over multiple iterations of the neural network weights that produce the best enlightened image in the RGB space from the Bayer-pattern raw images. Back-projection by darkening an enlightened image allows for lightening errors to be detected and then corrected for to obtain more accurate enlightened images.

FIG. 6 shows the basic architecture for BP layer 50 and BP channel shrink layer 60. BP layer 50 increases the channel/depth number from CH to CH*2, while BP channel shrink layer 60 decreases the channel/depth number from CH to CH/2).

BP layer 50 has an additional max pooling on the input that is performed by a max pooling layer followed by a channel attention layer in the previous layer, and denoising can be performed on the output from this channel attention layer rather than on the max pooling layer from the previous layer. Also, BP layer 50 increases the channel/depth number from CH to CH*2, when downsampled images 264 are considered to be the input to the BP layer 50, while increasing the feature-map depth. BP channel shrink layer 60 does not change the resolution of the spatial pixel-derived data but decreases the channel/depth number from CH to CH/2.

Figure 7:
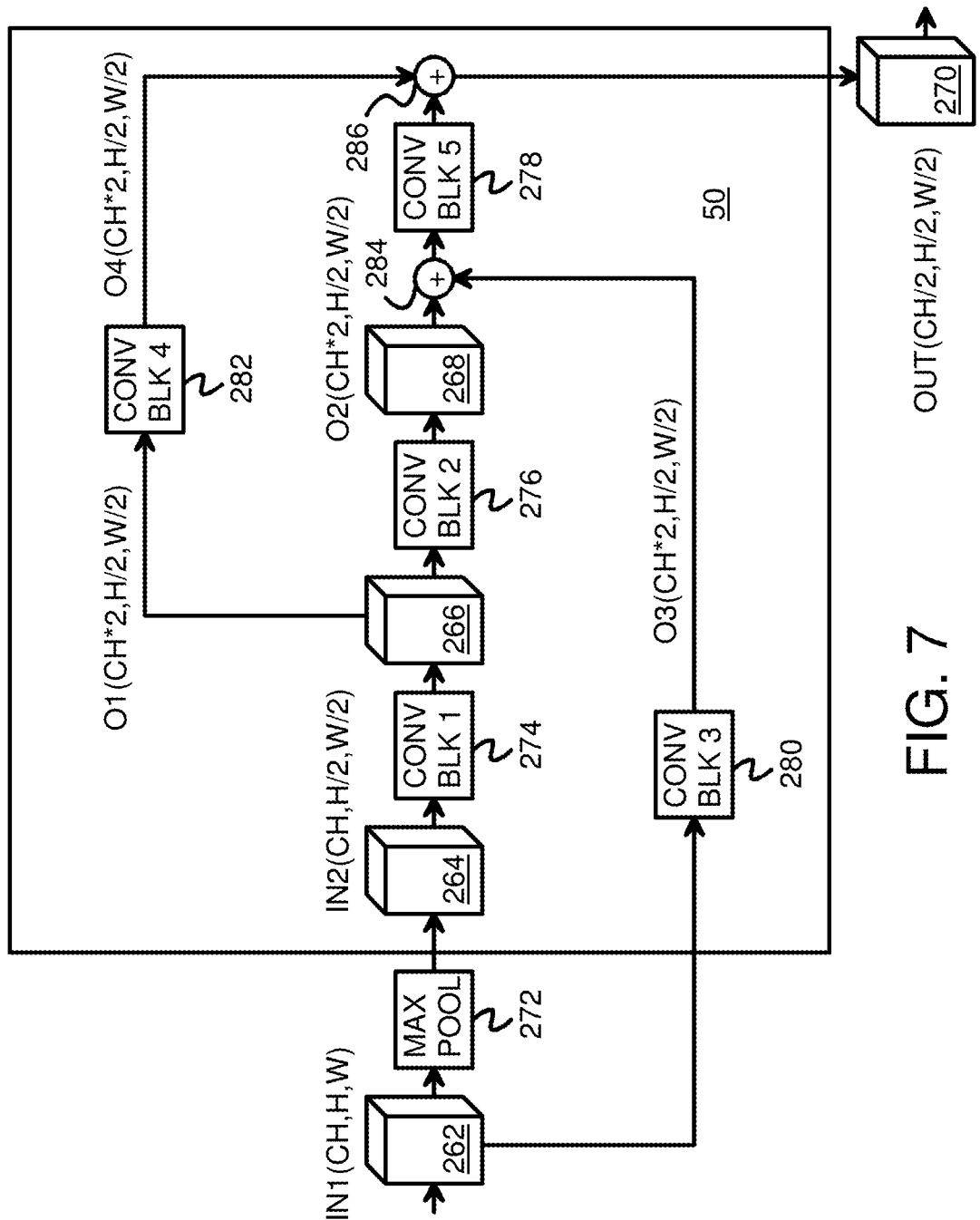
FIG. 7 is a convolution network to implement the BP layer in the contracting layers of the neural network.

FIG. 7 is a convolution network to implement the BP layer in the contracting layers of the neural network. This network of FIG. 7 implements BP layer 50 and corresponds to that shown in FIG. 6, with first convolution block 274 implementing L1 lightening operator 212, second convolution block 276 implementing D darkening operator 214, third convolution block 280 implementing FN de-noise operator 226, fourth convolution block 282 implementing FW weighting operator 224, and fifth convolution block 278 implementing L2 lightening operator 218.

Raw input images 262 from the LL domain IN1(CH,H,W) are applied to max pooler 272 to downsample to generate input downsampled images 264, IN1(CH,H/2.W/2). First convolution block 274 performs L1 lightening to generate enlightened LL domain image 266, O1(CH*2,H/2.W/2). Max pooler 272 may be considered to be not part of BP layer 50 and separate from BP layer 50, depending on logical partitioning.

Second convolution block 276 implements D darkening operator 214 and back-projects enlightened LL domain image 266, O1(CH*2,H/2.W/2) into the Low-Light (LL) domain to generate back-projected LL domain image 268, O2(CH*2,H/2.W/2). Adder 284 then subtracts the denoised input from third convolution block 280 that implements FN de-noise operator 226. The resulting BP error in the LL domain is transformed into the NL domain by fifth convolution block 278, which implements L2 lightening operator 218.

Fourth convolution block 282 generates weighted inputs O4(CH*2,H/2.W/2) from enlightened LL domain image 266, O1(CH*2,H/2.W/2). These weighted inputs are added by adder 286 to the error in the NL domain generated by fifth convolution block 278 to generate enhanced output 270, OUT(CH*2_H/2.W/2), which is the enlightened image in the NL domain.

Convolution blocks 274, 276, 280, 282, 278, respectively, can be described by the following operations:

Conv block 1: sequential(nn.Conv2d(channel_num, channel_num*2, kernel_size=3, stride=1, padding=1), lrelu, nn.Conv2d(channel_num*2, channel_num*2, kernel_size=3, stride=1, padding=1), lrelu)

The inventors here use 2 convolutions ("nn.Conv2d") in sequence within each one of convolution blocks 274, 276, 280, 282, 278. In the first convolution, the inventors try to increase the feature information by doubling the output channel/depth number. This is followed by another convolution to make the information stable.

Conv block 2: sequential(nn.Conv2d(channel_num*2, channel_num*2, kernel_size=3, stride=1, padding=1), lrelu)

Conv block 3: sequential(nn.Conv2d(channel_num, channel_num*2, kernel_size=1, stride=2, padding=0), lrelu)

Conv block 4: sequential(nn.Conv2d(channel_num*2, channel_num*2, kernel_size=1, stride=1, padding=0), lrelu)

Conv block 5: sequential(nn.Conv2d(channel_num*2, channel_num*2, kernel_size=3, stride=1, padding=1), lrelu)

Figure 8:
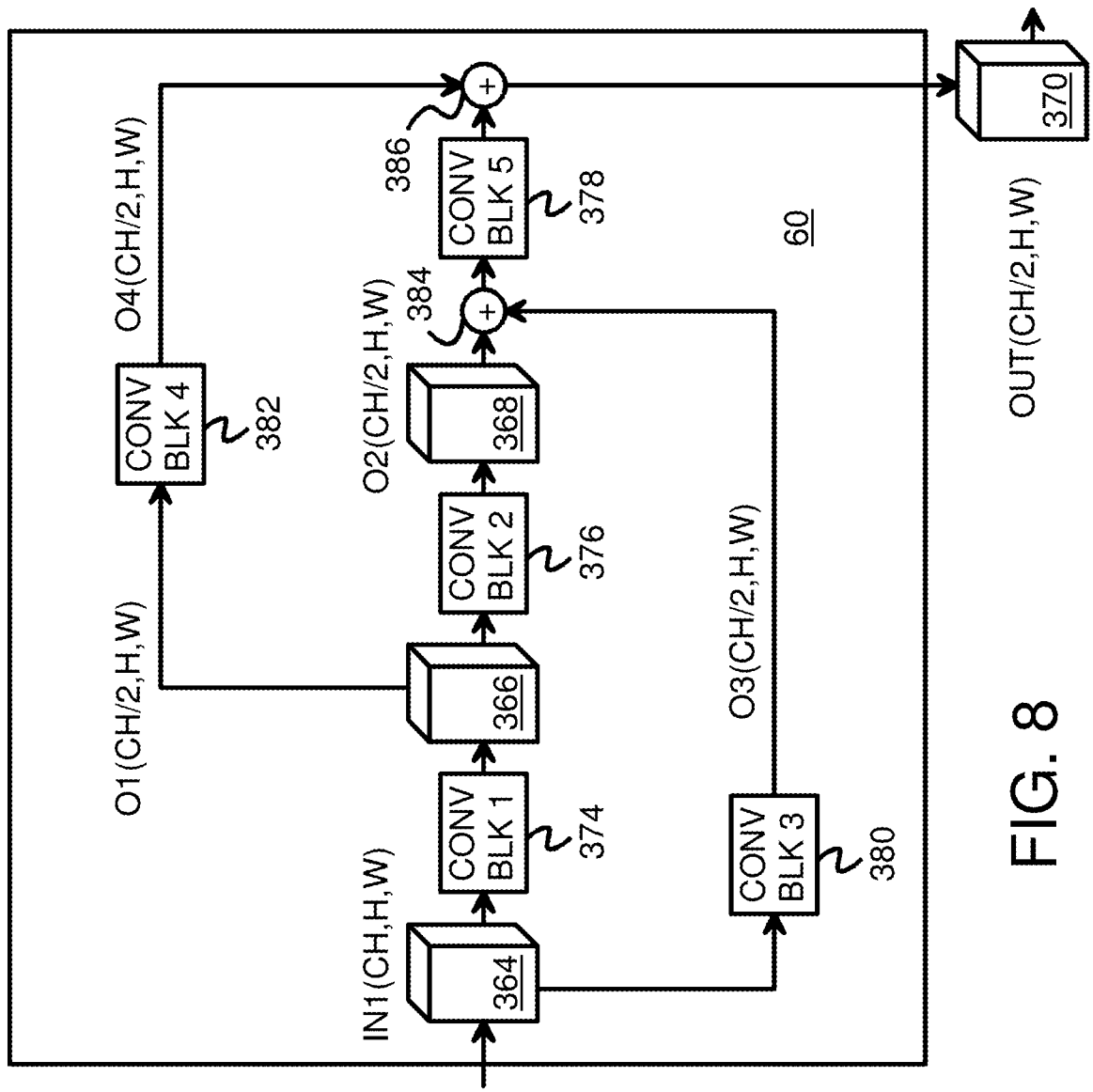
FIG. 8 is a convolution network to implement the BP channel shrink layer in the expansion layers of the neural network.

FIG. 8 is a convolution network to implement the BP channel shrink layer in the expansion and concatenation layers of the neural network. This network of FIG. 8 implements BP channel shrink layer 60 and corresponds to that shown in FIG. 6, with first convolution block 374 implementing L1 lightening operator 212, second convolution block 376 implementing D darkening operator 214, third convolution block 380 implementing FN de-noise operator 226, fourth convolution block 382 implementing FW weighting operator 224, and fifth convolution block 378 implementing L2 lightening operator 218.

Input images 364 from the LL domain are designated as IN1(CH,H,W). First convolution block 374 performs L1 lightening to generate enlightened LL domain image 366, O1(CH/2,H,W) with half of the input feature depth.

Second convolution block 376 implements D darkening operator 214 and back-projects enlightened LL domain image 366, O1(CH/2,H,W) into the Low-Light (LL) domain to generate back-projected LL domain image 368, O2(CH/2,H,W). Adder 384 then subtracts the denoised input from third convolution block 380 that implements FN de-noise operator 226. The resulting BP error in the LL domain is transformed into the NL domain by fifth convolution block 378, which implements L2 lightening operator 218.

Fourth convolution block 382 generates weighted inputs O4(CH/2,H,W) from back-projected LL domain image 366, O1(CH/2,H,W). These weighted inputs are added by adder 386 to the error in the NL domain generated by fifth convolution block 378 to generate enhanced output 370, OUT(CH/2,H,W), which is the enlightened image in the NL domain.

Convolution blocks 274, 276, 280, 282, 278, respectively, can be described by the following operations:

Conv block 1: sequential(nn.Conv2d(channel_num, channel_num/2, kernel_size=3, stride=1, padding=1), lrelu, nn.Conv2d(channel_num/2, channel_num/2, kernel_size=3, stride=1, padding=1), lrelu)

Conv block 2: sequential(nn.Conv2d(channel_num/2, channel_num/2, kernel_size=3, stride=1, padding=1), lrelu)

Conv block 3: sequential(nn.Conv2d(channel_num, channel_num/2, kernel_size=1, stride=1, padding=0), lrelu)

Conv block 4: sequential(nn.Conv2d(channel_num/2, channel_num/2, kernel_size=1, stride=2, padding=0), lrelu)

Conv block 5: sequential(nn.Conv2d(channel_num/2, channel_num/2, kernel_size=3, stride=3, padding=1), lrelu)

Figure 9:
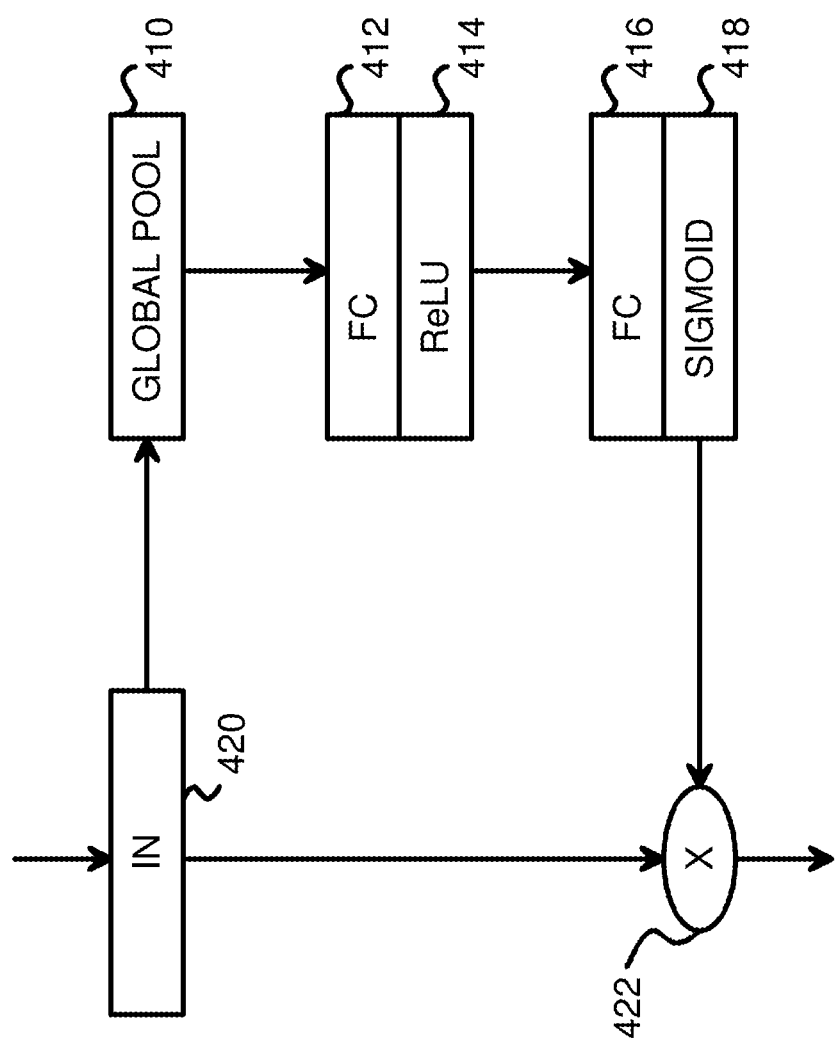
FIG. 9 shows the channel attention layer in more detail.

FIG. 9 shows the channel attention layer in more detail. Layer input 420 is pooled by global pooler 410 and the pooled result applied to a Fully-Connected (FC) network 412 and then rectified by ReLU 414. This result is then applied to another FC network 416 that uses Sigmoid function 418 to extract features that are multiplied by input 420 by multiplier 422 to generate the feature map result.

Figure 10:
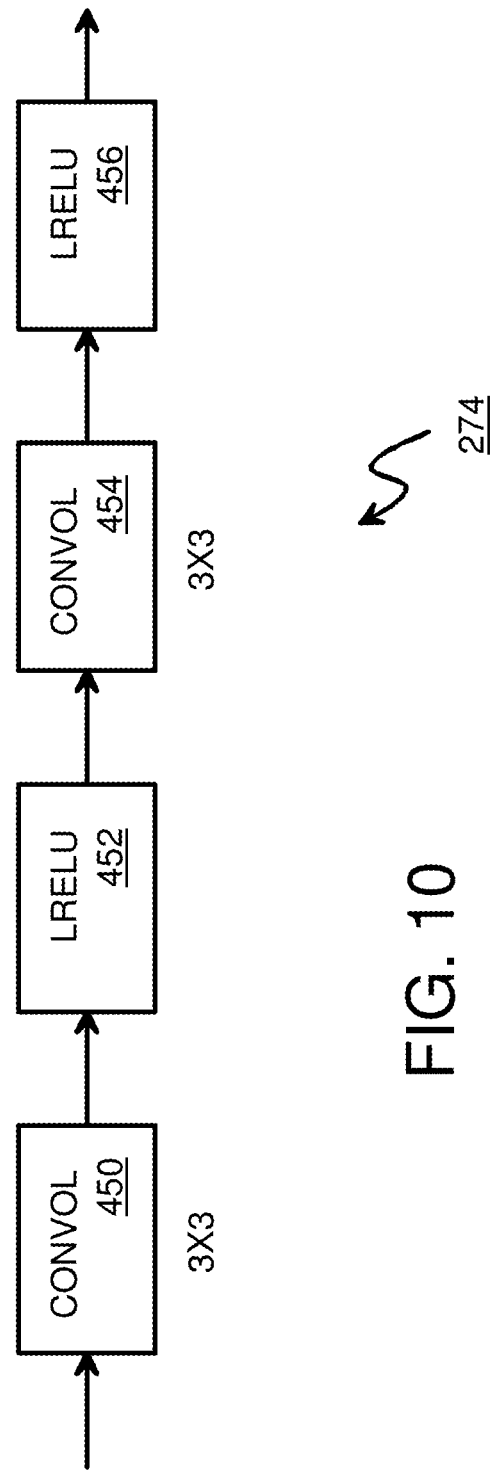
FIG. 10 shows the first convolution block in more detail.

FIG. 10 shows the first convolution block in more detail. First convolution block 274 implements L1 lightening operator 212. Two convolution operations and two LeRU operations are performed by first convolution block 274. Initial convolution 450 doubles the depth or the number of feature channels using a kernel size of 3. Leaky ReLU 452 rectifies the result, which is input to final convolution 454, which does not change the depth. Leaky ReLU 456 rectifies the final result.

Convolution block 274 has two convolutions and two leaky ReLU (lrelu) operations, as described by the following operation:

Conv block 274: sequential(nn.Conv2d(channel_num, channel_num*2, kernel_size=3, stride=1, padding=1), lrelu, nn.Conv2d(channel_num*2, channel_num*2, kernel_size=3, stride=1, padding=1), lrelu)

Using two convolutions rather than one eliminates residual information in the convolution blocks and improves the Peak Signal-to-Noise Ratio (PSNR). The inventors use a first lightening operator unit using two convolutions in series to lighten input pixels to generate enlightened pixels, so that an average luminance of the enlightened pixels is greater than an average luminance of the input pixels. Using two convolutions in series can generate more features for possible end-to-end lightening. The inventors believe that low-light image lightening may not only increase pixel value offsets, but also improve other factors such as dynamic range, contrast, etc., that can be learned by the model automatically.

Figure 11:
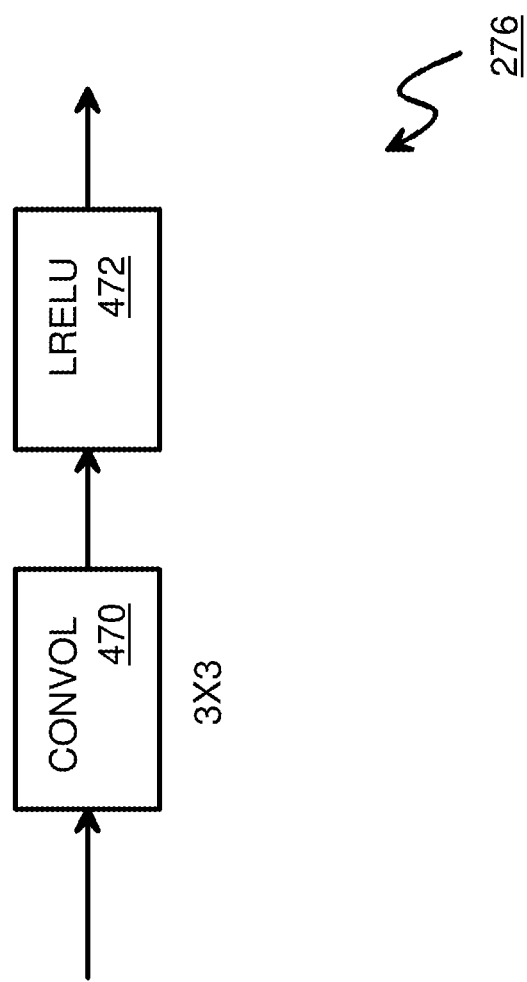
FIG. 11 shows the second convolution block in more detail.

FIG. 11 shows the second convolution block in more detail. Second convolution block 276 implements D darkening operator 214. Only a single convolution block and a single leaky ReLU (lrelu) are used. Convolution 470 has a kernel size of 3 and does not change the feature depth. Leaky ReLU 472 rectifies the final result.

Second convolution block 276 has one convolution and one leaky ReLU operation, as described by the following operation:

Conv block 276: sequential(nn.Conv2d(channel_num*2, channel_num*2, kernel_size=3, stride=1, padding=1), lrelu)

FIG. 12 shows training a neural network such as the neural network of FIG. 1 or 5-12. Raw data such as Bayer pattern raw images are used as video training data 34, V_RAW. The desired enlightened RGB video data that corresponds to the V_RAW values are recorded as target data 38, RGB_EN. Each value of RGB_EN corresponds to a value of V_RAW that were measured together, such as the Bayer pattern output from image sensor 512 and the enlightened RGB image generated from V_RAW, such as by a high-end graphics processor. The target images RGB_EN could also be generated from V_RAW or from another image captured by a better camera using a more accurate image processing routine that is too computationally complex and expensive for portable applications.

Neural network 36 receives training data 34 and a current set of weights $A_{ij}$, $B_{ij}$, $W_{ij}$, and operates on training data 34 to generate a result. This generated result is the modeled value of the RGB enlightened image, RGB_CALC. The generated result from neural network 36, RGB_CALC, is compared to target data 38, RGB_EN, by loss function 42, which generates a loss value that is a function of how far the generated result is from the target. The loss value generated by loss function 42 is used to adjust the weights applied to neural network 36. Many iterations of weights may be applied by loss function 42 onto training data 34 until a minimum loss value is identified, and the final set of weights used to model the calibration curve.

Rather than generate a single value of RGB_CALC, neural network 36 may have multiple output nodes 60 to generate many RGB_CALC values in parallel from the parallel inputs of V_RAW. Loss function 42 may compare in parallel the many values of RGB_CALC to many values of RGB_EN to generate a loss function value. For example, blocks of pixels may be compared for adjacent video frames.

Alternately, a smaller region of the image frame, such as the area around a license plate, could be evaluated based on the ability of an Optical Character Recognition (OCR) module to accurately extract the license plate's numbers and letters. Loss function 42 could take an input from the OCR module (not shown) when generating the loss function value.

The loss during neural network training generated by loss function 42 can be generated as:

Loss=a*Huber loss+b*L1 loss+c*MS_SSIM where L1 is a Least absolute deviation loss, MS_SSIM is a Multiple Scale Structural SIMilarity (SSIM) loss function, parameters a, b, c are set to a=0.25, b=0.25, c=0.5. L1 loss measures the Mean Absolute Error (MAE) between each element in the input x and target y.

Combining three different kinds of losses, Huber loss, L1 loss, and MS_SSIM loss, can achieve a better objective and improve subjective image quality.

Figure 13A:
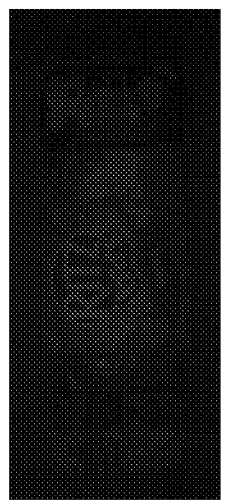
FIGS. 13A-13B show image enlightening during Back-Projection neural network conversion from Bayer to RGB.
Figure 13B:
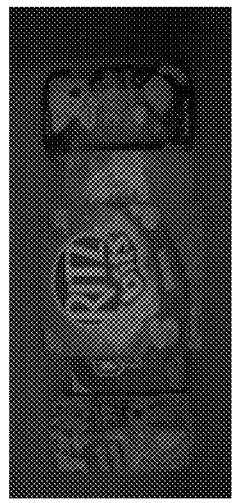

FIGS. 13A-13B show image enlightening during Back-Projection neural network conversion from Bayer to RGB. In FIG. 13A, the raw Bayer-pattern image is too dark to read text. Using a Back-Projection neural network to convert the raw Bayer-pattern image of FIG. 13A to the RGB image of FIG. 13B results in an enlightened image in RGB format. The larger text on the box can be clearly read from the enlightened image of FIG. 13B but not from the darker raw image of FIG. 13A.

Alternate Embodiments

Several other embodiments are contemplated by the inventors. For example the kernel size in third convolution block 280 and fourth convolution block 282 in FIG. 7 and FIG. 8 can be 3, but at the cost of computation complexity. In the U-net, contracting layers 52, 54, 56, 58 can be considered to downsample pixels since the frame size H,W is reduced to H/2.W/2 for each layer while the feature-map depth increases. Expansion layers 72, 74, 76, 78 can be considered to upsample pixels since the frame size H,W is increased to H*2.W*2 for each layer as the feature-map depth decreases as feature information is consumed. While a scaling factor of 2 is described for each layer, other scaling factors could be substituted. The value of n can be 8, 16, 24, etc., when n increases; typically the accuracy will increase but at the cost of computation complexity.

A complex operation with convolution and ReLU has been described, but other operation types could be substituted or merged. Many modifications to the operations are possible, such as the activation function being a global ReLU, leaky ReLU, Parametric Rectified Linear Unit (PreLU), Exponential Linear Unit (ELU), Scaled Exponential Linear Unit (SELU), Concatenated Rectified Linear Unit (CRelu), Randomized Rectified Linear Unit (Rrelu), etc. Convolutions are widely used in neural networks, especially for image processing, where a filter many be applied many times over the image data to generate activations that form a feature map. These features can be selected for further or more specialized processing. ReLU operations are also widely used and useful to eliminate negative value or negative slope effects that can confuse the data analysis.

Some embodiments may not use all components. Additional components may be added. Loss function 42 may use various error/loss and cost generators, such as a weight decay term that prevents weights from growing too large over many cycles of training optimization, a sparsity penalty that encourages nodes to zero their weights, so that only a small fraction of total nodes is used. Many substitutions, combinations, and variations are possible. Other variations and kinds of loss or cost terms can be added to loss function 42. The values of the relative scaling factors for the different cost functions can be adjusted to balance the impact of the various functions. The training endpoint for the neural network may be set for various combinations of conditions, such as a desired final accuracy, an accuracy-hardware cost product, a target hardware cost, etc.

Neural network 36, loss function 42, and other components may be implemented in a variety of technologies, using various combinations of software, hardware, firmware, routines, modules, functions, etc. The final result may be derived from neural network 36 with the final weights, and might be implemented as a program module, or in an Application-Specific Integrated Circuit (ASIC) or other hardware to increase processing speed and lower power consumption.

Terms such as left, right, up, down, are relative and can be flipped, rotated, transformed, or transposed in various ways. Adders may add complement values to implement subtraction. Subtraction and addition thus can be used interchangeably.

The data operated upon at different ones of contracting layers 52, 54, 56, 58 and expansion layers 72, 74, 76, 78 may be referred to as pixels, although after downsampling by contracting layers 52, 54, 56, 58, each pixel may be a combination of data from many input pixels from the input frame. Thus the intermediate data may not be a true pixel for display, but a derivative or transformation of the original display pixels. However the term pixel may still be used herein for these intermediate data items.

The max pooling layer may be considered to the first part of each contracting layers 52, 54, 56, 58 rather than the last part of each of contracting layers 52, 54, 56, 58. Various other re-arrangements may occur. Many variations of the channel attention layer are also possible.

Some components such as a white balancer could be added or removed. Other modules can be added such as for edge enhancement and color enhancement. Edge enhancement can be performed on the luminance while color enhancement could be performed on the chrominance components only, for example. Other kinds of image sensors could be substituted, and additional buffering and pipeline registers can be added at several points in the data path. Parallel data paths could be used to increase throughput. Larger buffers for larger pixel formats could be used, such as a Bayer-pattern buffer or a luminance buffer, or even full-frame buffers. Pixels in buffers may be physically stored in various arrangements. Various interleaving and mapping schemes could alter the actual storage locations to optimize bandwidth or other design parameters. Many memory arrangements, both physical and logical, are possible.

Various parallel processing techniques may be used that perform the basic operations described here in a serial fashion for easier understanding. Appropriate input and coefficient changes can be made by a person of skill in the art. Partial or other calculations may be performed near the edges of the Bayer pattern, such as for pixel locations 1,3 and 1,1 and 3,1. These edge locations lack the normal number of input pixels and must be averaged over a smaller number of pixel inputs.

Different data encodings and primary colors can be used. Bit widths can be varied. Many data formats may be used with the invention. Additional functions can be added. Many arrangements of adders, shifters, and logic units are possible. Adders may be reused or used recursively. Some image sensors may alter the Bayer pattern in different ways, such as by producing data from lower lines before upper lines. Various modifications can be made as needed to accommodate these changes.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An image-enlightening and pixel-interpolating neural network implemented on a computer or a machine comprising:
a series of contracting layers, each contracting layer reducing a number of pixels and increasing feature-map depth;
a series of expansion layers, after the series of contracting layers, each expansion layer increasing a number of pixels and decreasing feature-map depth;
each contracting layer in the series of contracting layers comprising a max pooling layer, a Back-Projection (BP) layer, and a channel attention layer;
each expansion layer in the series of expansion layers comprising a transpose layer and a BP channel shrink layer;
a first layer that receives mono-color pixels each having only one color, the mono-color pixels being arranged in a Bayer pattern in an input frame, the first layer driving an input to an initial contracting layer in the series of contracting layers; and
a last layer that receives RGB pixels from a final expansion layer in the series of expansion layers, the RGB pixels each having color intensity information for three colors, the last layer arranging the RGB pixels into an output frame of at least a size of the input frame;
wherein the BP layer and the BP channel shrink layer each comprise:
a first lightening operator unit using two convolutions in series to lighten input pixels to generate enlightened pixels, wherein an average luminance of the enlightened pixels is greater than an average luminance of the input pixels;
a darkening operator unit to darken the enlightened pixels to generate back-projected pixels, wherein an average luminance of the back-projected pixels is less than an average luminance of the enlightened pixels;
a de-noise operator unit that generates denoised input pixels from the input pixels;
a first adder that adds the denoised input pixels to the back-projected pixels to generate a low-light back-projection error;
a second lightening operator unit to lighten the low-light back-projection error to generate a normal-light back-projection error;
a weighting operator unit that weights the input pixels to generate weighted input pixels; and
a second adder that adds the weighted input pixels to the normal-light back-projection error to generate output enlightened pixels.

2. The image-enlightening and pixel-interpolating neural network of claim 1 wherein the BP layer further comprises:
a max pooler that receives pixels output by a prior contracting layer in the series of contracting layers, or from the first layer, the max pooler pooling received pixels to generate the input pixels;
wherein the max pooler reduces a number of pixels to generate the input pixels.

3. The image-enlightening and pixel-interpolating neural network of claim 2 wherein the darkening operator unit, the de-noise operator unit, the second lightening operator unit, and the weighting operator unit each comprise a convolution block and an activation function in series.

4. The image-enlightening and pixel-interpolating neural network of claim 3 wherein the first lightening operator unit comprises:
a first convolution block that generates a first convolution output from the input pixels;
a first leaky rectified linear unit (lrelu) that generates a first rectified output from the first convolution output;
a second convolution block that generates a second convolution output from the first rectified output;
a second leaky rectified linear unit (lrelu) that generates a second rectified output from the second convolution output;
wherein the second leaky rectified linear unit outputs the enlightened pixels as the second rectified output.

5. The image-enlightening and pixel-interpolating neural network of claim 4 wherein the series contracting layers and the series of expansion layers form a U-net convolution neural network.

6. The image-enlightening and pixel-interpolating neural network of claim 5 wherein the first layer concatenates multiple frames of the mono-color pixels from different timeslots or from different scaling factors together to drive the input to the initial contracting layer in the series of contracting layers.

7. The image-enlightening and pixel-interpolating neural network of claim 5 further comprising:
a loss function generator that compares the output frame generated by the last layer to an expected target frame when training data is applied to the first layer, the loss function generator adjusting weights applied to the series of contracting layers and applied to the series of expansion layers during a neural network learning process.

8. The image-enlightening and pixel-interpolating neural network of claim 7
wherein the loss function generator further comprises:
a combination of a Huber loss, a Least-Absolute Deviation L1 loss, and a multiple-scale Structural SIMilarity (SSIM) loss.

9. The image-enlightening and pixel-interpolating neural network of claim 5
wherein the input frame further comprises a Bayer pattern of mono-color pixels including green pixels in a checkerboard pattern with blue pixels and red pixels alternately filling locations in the checkerboard pattern between the green pixels;
wherein the output frame further comprises a RGB pixel for each location of a green pixel in the input frame, and for each location of a red pixel in the input frame, and for each location of a blue pixel in the input frame, wherein each location of a mono-color pixel in the input frame is loaded with a RGB pixel in the output frame, wherein each RGB pixel comprises a red sub-pixel, a green sub-pixel, and a blue sub-pixel.

10. A neural network computer-implemented method comprising:
receiving a plurality of input frames of mono-color pixels, the mono-color pixels arranged in a Bayer pattern wherein each pixel location has color data for only one primary color;
concatenating the plurality of input frames to generate a first input to a series of contracting layers,
each concatenating layer in the series of contracting layers using a max pooling layer to reduce spatial pixel-derived data and increase feature-depth data, using a Back-Projection (BP) layer to convolute and enlighten the spatial pixel-derived data, and using a channel attention layer to identify relevant features of the spatial pixel-derived data output from the BP layer for output to a next contracting layer in the series of contracting layers;
wherein a final contracting layer in the series of contracting layers outputs to a first expansion layer in a series of expansion layers;
each expansion layer in the series of expansion layers concatenating spatial pixel-derived data from a contracting layer in the series of contracting layers with spatial pixel-derived data generated by a preceding expansion layer in the series of expansion layers to expand the spatial pixel-derived data and reduce the feature-depth data;
each expansion layer in the series of expansion layers using a BP channel shrink layer to convolute and enlighten the spatial pixel-derived data and using a channel attention layer to identify relevant features of the pixel-derived data output from the BP channel shrink layer for output to a next expansion layer in the series of expansion layers;
using a last layer to form the spatial pixel-derived data output by a last layer in the series of expansion layers into RGB pixels in an output frame, wherein each RGB pixel has color data for three primary colors,
whereby mono-color pixels are enlightened and converted to RGB pixels.

11. The neural network computer-implemented method of claim 10 wherein the BP layer and the BP channel shrink layer further comprise:
lightening the spatial pixel-derived data by convoluting and rectifying and again convoluting and again rectifying the spatial pixel-derived data to generate predicted data;
darkening the predicted data by convoluting and rectifying the predicted data to generate back-projected data;
denoising the spatial pixel-derived data by convoluting and rectifying to generate denoised data;
adding the denoised data to the back-projected data to generate a low-light error;
lightening the low-light error by convoluting and rectifying to generate a normal-light error;
weighting the spatial pixel-derived data to generate weighted spatial pixel-derived data;
adding the normal-light error to the weighted spatial pixel-derived data to generate enlightened spatial pixel-derived data for output by the BP layer or by the BP channel shrink layer.

12. The neural network computer-implemented method of claim 11 further comprising:
(a) executing a training routine by applying training data as the plurality of input frames of mono-color pixels, and comparing the RGB pixels in the output frame generated by the last layer to expected RGB pixels in a target output frame to generate a loss function;
using the loss function to adjust weights applied to convolutions in the BP layer and in the BP channel shrink layer;
repeating from (a) until the loss function reaches an endpoint.

13. The neural network computer-implemented method of claim 12 wherein the loss function further comprises:
generating a Huber loss;
generating a Least-Absolute Deviation L1 loss;
generating a multiple-scale Structural SIMilarity (SSIM) loss;
combining the Huber loss, the Least-Absolute Deviation L1 loss, and the multiple-scale Structural SIMilarity (SSIM) loss;
outputting a combination of the combination of the Huber loss, the Least-Absolute Deviation L1 loss, and the multiple-scale Structural SIMilarity (SSIM) loss as an output of the loss function.

14. The neural network computer-implemented method of claim 11 further comprising:
receiving a plurality of input frames of mono-color pixels for different timeslots.

15. The neural network computer-implemented method of claim 11 further comprising:
receiving a plurality of input frames of mono-color pixels having different scaling factors.

16. A back-projection image processor comprising:
a convolution neural network having contracting layers and expansion layers that form a U-net, the convolution neural network further comprising:
an input layer that receives multiple input frames of mono-color pixels, wherein each pixel location in an input frame has data for only one of three primary colors, the input layer outputting spatial pixel-derived data and feature-depth data;

a series of contracting layers after the input layer, each contracting layer having a Back-Projection (BP) layer;

a series of expansion layers after the series of contracting layers, each expansion layer having a concatenation layer that concatenates an output from a preceding expansion layer with an output from a contracting layer, and a BP layer in each expansion layer;

an output layer that receives an output from a last of the series of expansion layers, and outputs an output frame of RGB pixels generates from the spatial pixel-derived data, wherein each RGB pixel has data for all three primary colors for each pixel location in the output frame;

wherein the BP layer comprises:

a first lightening unit that lightens the spatial pixel-derived data by convoluting and rectifying and again convoluting and again rectifying the spatial pixel-derived data to generate predicted data;

a darkening unit that darkens the predicted data by convoluting and rectifying the predicted data to generate back-projected data;

a denoise unit that denoises the spatial pixel-derived data by convoluting and rectifying to generate denoised data;

a first adder that adds the denoised data to the back-projected data to generate a low-light error;

a second lightening unit that lightens the low-light error by convoluting and rectifying to generate a normal-light error;

a weight unit that weights the spatial pixel-derived data to generate weighted spatial pixel-derived data; and a second adder that adds the normal-light error to the weighted spatial pixel-derived data to generate enlightened spatial pixel-derived data for output by the BP layer.

17. The back-projection image processor of claim 16 wherein the first lightening unit comprises:

a first convolution unit that convolutes the spatial pixel-derived data to generate a first output;

a first leaky Rectified Linear Unit (lrelu) that rectifies the first output to generate a second output;

a second convolution unit that convolutes the second output to generate a third output;

a second leaky Rectified Linear Unit (lrelu) that rectifies the third output to generate a fourth output;

wherein the fourth output is output by the first lightening unit.

18. The back-projection image processor of claim 17 wherein the contracting layer further comprises a channel attention layer;

wherein the expansion layer further comprises a channel attention layer.

19. The back-projection image processor of claim 18 wherein the contracting layer further comprises a max pooling layer.

20. The back-projection image processor of claim 16 wherein each contracting layer generates additional feature-depth data while reducing the spatial pixel-derived data by at least a factor of 2;

wherein each expansion layer consumes and reduces the feature-depth data while increasing the spatial pixel-derived data by at least a factor of 2.

* * * * *